US005478644A

United States Patent [19]
Takahashi

[11] Patent Number: 5,478,644
[45] Date of Patent: Dec. 26, 1995

[54] LAMINATED POLYESTER FILM

[75] Inventor: Jun Takahashi, Nagahama, Japan

[73] Assignee: Diafoil Hoechst Company, Limited, Tokyo, Japan

[21] Appl. No.: 155,305

[22] Filed: Nov. 22, 1993

[30] Foreign Application Priority Data

Nov. 25, 1992 [JP] Japan ................................ 4-337940

[51] Int. Cl.⁶ ........................... B32B 27/36; B29B 13/00
[52] U.S. Cl. ..................... 428/333; 428/336; 428/480; 428/483; 428/704; 428/910; 428/922; 427/367; 264/291
[58] Field of Search .................. 428/480, 922, 428/910, 483, 333, 336, 704; 264/291

[56] References Cited

U.S. PATENT DOCUMENTS 4,668,748  5/1987  Hardam et al. ..................... 526/240

FOREIGN PATENT DOCUMENTS 0435080  7/1991  European Pat. Off. .
0505861  9/1992  European Pat. Off. .

Primary Examiner—P. C. Sluby
Attorney, Agent, or Firm—Foley & Lardner

[57] ABSTRACT

A laminated polyester film comprising a polyester film and a layer comprising an antistatic agent and formed on at least one side of the polyester film, the antistatic agent being a high-molecular-weight antistatic agent having a nitrogen atom-containing group and a sulfonic acid or sulfonate group.

17 Claims, No Drawings

LAMINATED POLYESTER FILM

BACKGROUND OF THE INVENTION

The present invention relates to a laminated polyester film. More particularly, it relates to a laminated polyester film which is not impaired in its transparency and has excellent antistatic properties even when it is produced by the so-called in-line coating method.

Biaxially stretched polyester films have many excellent properties such as flatness, chemical resistance, mechanical strength, etc., but have the disadvantage that they tend to be electrically charged.

As means for preventing static charging, it is generally practiced to incorporate a low-molecular-weight surfactant type compound as an antistatic agent in a polyester resin or to coat said compound on the surface of a polyester film. However, the low-molecular-weight antistatic agents unfavorably tend to bloom.

High-molecular-weight antistatic agents such as sodium polystyrenesulfonate are known as the antistatic agents proof against blooming. However, in case of using sodium polystyrenesulfonate, when the so-called in-line coating method, that is, a method in which the surface of a polyester film is coated and then the coated polyester film is stretched, is used for forming a laminated polyester film, the coating layer may become discontinuous depending on the working conditions, making it unable to obtain the desired antistatic effect. Further, the coating layer may have many cracks to cause blushing of the film, so that this is unsuited for use where transparency is required.

The present inventors have found that by using a specific antistatic agent, a laminated polyester film which is not impaired in its transparency and has excellent antistatic properties even when produced by the so-called in-line coating method can be obtained. The present invention was attained on the basis of this finding.

SUMMARY OF THE INVENTION

An object of the present invention is to provide a laminated film having excellent antistatic property and high transparency which can be produced by the in-line coating method.

In an aspect of the present invention, there is provided a laminated polyester film comprising a polyester film and a layer comprising an antistatic agent and formed on at least one side the polyester film, the antistatic agent being a high-molecular-weight antistatic agent having a nitrogen atom-containing group and a sulfonic acid or sulfonate group.

DETAILED DESCRIPTION OF THE INVENTION

The polyester usable in the present invention includes, as typical examples, polyethylene terephthalate in which 80 mol % or more of the structural units are constituted by ethylene terephthalate unit, polyethylene naphthalate in which 80 mol % or more of the structural units are constitued by ethylene naphthalate unit, and poly-1,4-cyclohexanedimethylene terephthalate in which 80 mol % or more of the structural units are constituted by 1,4-cyclohexanedimethylene terephthalate unit. It also includes polyethylene isophthalate, polybutylene terephthalate and the like.

As a copolymerizable component other than the primary components of the polyester, there can be used, for example, a diol such as diethylene glycol, polypropylene glycol, neopentyl glycol, polyethylene glycol and polytetramethylene glycol, and an ester-forming derivative such as isophthalic acid, 2,6-naphthalenedicarboxylic acid, 5-lithiumsulfoisophthalic acid, adipic acid, azelaic acid, sebacic acid and oxymonocarboxylic acid. As the polyester, it is possible to use homopolymers and copolymers as well as the blends thereof with small quantities of other resins.

The polyester film used in the present invention may contain additive particles, precipitated particles, catalyst residues and the like as a protuberance-forming agent for imparting slip characteristics to the film. The kind, particle size and amount blended of such protuberance-forming agent are properly selected in consideration of slip characteristics, transparency and other properties of the produced film.

As additives other than the protuberance-forming agent, there can be used, if necessary, an antistatic agent, a stabilizer, a lubricant, a crosslinking agent, an anti-blocking agent, an antioxidant, an ultraviolet absorber, a light screening agent, a colorant and the like. The additives also include white pigments such as titanium oxide, barium sulfate and magnesium oxide used for whitening the film, resins incompatible with the polyester, which are used for lowering a film density, and void-forming agents such as polypropylene. The polyester film used in the present invention may have a multi-layer structure, in which part of the layers may be formed with a polymer or polymers other than polyesters.

In the present invention, a high-molecular-weight antistatic agent having a nitrogen atom-containing group and a sulfonic acid or sulfonate group is used as the antistatic agent. Examples of the nitrogen atom-containing group in the high-molecular-weight antistatic agent are amino group (—NH$_2$), alkylamino group (—NHR, —NR$_2$ wherein R is alkyl) and pyridyl group (NC$_5$H$_4$—). The high-molecular-weight antistatic agent can be obtained by copolymerization of a monomer containing nitrogen atom with a monomer containing a sulfonic acid or sulfonate group. The nitrogen atom-containing monomers include those represented by the following formulae (1) to (5):

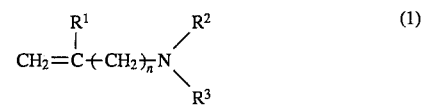

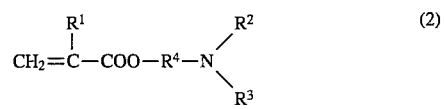

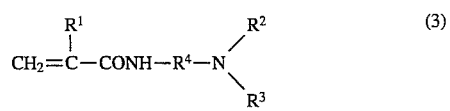

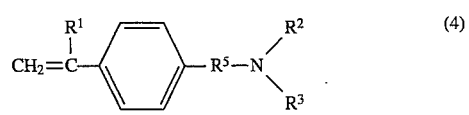

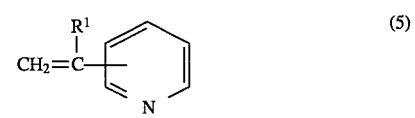

In the above formulae $R^1$, $R^2$ and $R^3$ each represent independently hydrogen atom or $C_1$–$C_2$ alkyl group, preferably hydrogen atom or methyl group; $R^4$ and $R^5$ each represent independently $C_1$–$C_4$ alkylene group, preferably methylene, ethylene or propylene group; and n is an integer of not less than 1, preferably 1 or 2.

The monomer (1) includes allylamine and vinylethylamine; the monomer (2) includes dimethylaminoethyl acrylate, dimethylaminoethyl methacrylate and diethylaminoethyl methacrylate; the monomer (3) includes dimethylaminopropylacrylamide; the monomer (4) includes dimethylaminoethylstyrene; and the monomer (5) includes 2-vinylpyridine and 4-vinylpyridine.

When the nitrogen atom-containing group is an amino group, such amino group can be formed by polymerizing vinylformamide ($CH_2$=CH—NHCHO) and then hydrolyzing the polymer.

The nitrogen atom-containing monomers usable in the present invention are not limited to the above-mentioned monomers (1)–(5); it is possible to use the analogous compounds and other monomers containing nitrogen atom as far as they are compolymerizable with the monomers containing a sulfonic acid or sulfonate group mentioned below. Also, the nitrogen atom-containing monomer may be used either singly or in combination.

The monomers containing a sulfonic acid or sulfonate group include those represented by the following formulae (a) to (e):

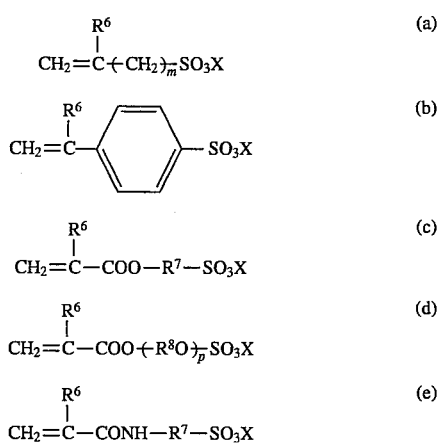

In the above formulae, $R^6$ represents hydrogen atom or $C_1$–$C_2$ alkyl group, preferably hydrogen atom or methyl group; $R^7$ and $R^8$ each represent independently $C_1$–$C_4$ alkylene group, preferably methylene, ethylene, propylene or butylene group, more preferably methylene, ethylene or propylene group; X represents hydrogen atom, alkaline metal atom, ammonium group, $C_1$–$C_4$ alkylammonium group, phosphonium group or $C_1$–$C_4$ alkylphosphonium group; m is an integer of not less than 0, preferably 0 to 4, more preferably 0 to 3; and p is an integer of not less than 1, preferably 1 to 5.

The monomer (a) includes vinylsulfonic acid, allylsulfonic acid, methallylsulfonic acid, vinylethylsulfonic acid and vinylbutylsulfonic acid; the monomer (b) includes styrenesulfonic acid and α-methylstyrenesulfonic acid; the monomer (c) includes acrylic ethylsulfonic acid, acrylic propylsulfonic acid, methacrylic ethylsulfonic acid and methacrylic propylsulfonic acid; the monomer (d) includes acrylic or methacrylic esters of sulfuric monoesters of ethylene glycol, propylene glycol, isopropylene glycol, polyethylene glycol, polypropylene glycol and polyisopropylene glycol; and the monomer (e) includes acrylic or methacrylic acid amides of sulfonated alkyl.

The salts of the monomers (a) to (e) usable in the present invention include alkaline metal salts, ammonium salts, alkylammonium salts, phosphonium salts and alkylphosphonium salts of the sulfonic acids. In many cases, these monomers are preferably used in the form of a salt.

The monomers containing sulfonic acid or sulfonate group usable in the present invention are not limited to the above-mentioned monomers (a) to (e); it is possible to use the analogous compounds and other monomers containing sulfonic acid or sulfonate group as far as they are copolymerizable with the nitrogen atom-containing monomers. Also, the monomers containing sulfonic acid or sulfonate group may be used either singly or in combination.

In the present invention, along with the nitrogen atom-containing monomer and the monomer containing sulfonic acid or sulfonate group, there can be used other monomer(s) as copolymer component. Examples of such monomers include those represented by the following formulae (i) and (ii):

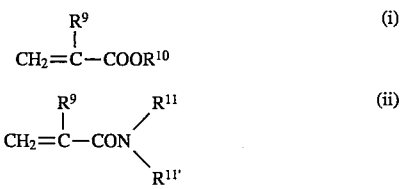

wherein $R^9$ represents hydrogen atom or $C_1$–$C_2$ alkyl group, preferably hydrogen atom or methyl group; $R^{10}$ represents hydrogen atom, $C_1$–$C_{18}$ alkyl group,

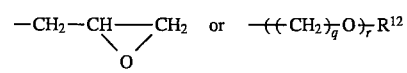

wherein $R^{12}$ represents hydrogen atom or $C_1$–$C_4$ alkyl group; q is an integer of 1 to 4; and r is an integer of 1 to 30; and $R^{11}$ and $R^{11'}$ each represent independently hydrogen atom, $C_1$–$C_4$ alkyl group or —$CHR^{13}OR^{14}$ wherein $R^{13}$ and $R^{14}$ each represent hydrogen atom or $C_1$–$C_2$ alkyl group.

The monomer (i) includes monoesters of glycols such as ethylene glycol, propylene glycol, diethylene glycol, triethylene glycol, polyethylene glycol and polypropylene, acrylic acid, methacrylic acid and their alkyl esters such as methyl ester, ethyl ester, propyl ester and butyl ester, and the monomer (ii) includes acrylamides, methacrylamides, alkylacrylamides or alkylmethacrylamides such as methyl-, ethyl-, propyl- and butylacryl(or methacyl)amides, and acrylamides or methacrylamides of alkylols (such as methylol) and alkoxyalkyls (such as methoxymethyl).

Beside the monomers (i) and (ii), there can also be used vinyl compounds such as propylene, butene, butadiene, isoprene, styrene, etc., and derivatives thereof, divinylbenzene, and bi- or higher-order-functional monomers, for example, polyhydric alcohols such as various types of glycols and polyvalent esters such as diesters and triesters of acrylic and methacrylic acids.

In the present invention, it is preferable that the content of the sulfur atoms in the high-molecular-weight antistatic agent is 1 to 20% by weight and the content of the nitrogen atoms in the high-molecular-weight antistatic agent is 0.03 to 10% by weight. The nitrogen atoms are introduced by the nitrogen atom-containing group, while the sulfur atoms are introduced by the sulfonic acid or sulfonate group.

When the content of the nitrogen atoms is less than 0.03% by weight, adhesiveness of the high-molecular-weight antistatic agent to the base polyester film tends to be weakened and consequently, when a in-line coating method is used as means for providing the layer containing the antistatic agent on the surface of the polyester film, transparency of the film may deteriorate. On the other hand, when the content of the nitrogen atoms is higher than 10% by weight, dispersion stability of the high-molecular-weight antistatic agent itself tends to lower, resulting in deterioration of adhesiveness of the antistatic agent to the base polyester film and its compatibility with other resins when they are blended. Further, coloration may be caused depending on the polymerization conditions for obtaining the high-molecular-weight antistatic agent. The preferred content of the nitrogen atoms in the high-molecular-weight antistatic agent is 0.05 to 7% by weight, the more preferred conteny being 0.1 to 5% by weight.

When the content of the sulfur atoms is less than 1% by weight, performance of the high-molecular-weight antistatic agent tends to be unsatisfactory, and when the ratio exceeds 20% by weight, polymerizability in the process for obtaining the high-molecular-weight antistatic agent and dispersion stability of the antistatic agent itself tend to deteriorate. Thus, the content of the sulfur atoms is preferably 3 to 18% by weight, more preferably 5 to 15% by weight.

In the present invention, the ratio of number of the sulfonic acid or sulfonate group to number of the nitrogen atom-containing group is preferably 1.05 to 150, more preferably 1.5 to 100. When this ratio is less than 1.05, dispersion stability of the high-molecular-weight antistatic agent tends to be unsatisfactory, and when said ratio exceeds 150, adhesiveness of the antistatic agent to the base polyester film may be weakened and also transparency of the laminated polyester film obtained by using a in-line coating method may deteriorate.

The high-molecular-weight antistatic agent used in the present invention may have any copolymer structure such as random, block and graft. The number-average molecular weight of the high-molecular-weight antistatic agent is usually $10^3$ to $10^7$, preferably 5,000 to 500,000.

The ratios of the structural units derived from the respective monomers in the high-molecular-weight antistatic agent are determined depending on the content of the sulfur atoms and the content of the nitrogen atoms in the antistatic agent and the ratio of number of the sulfonic acid or sulfonate to number of the nitrogen atom-containing group.

Copolymerization of the nitrogen atom-containing monomer and the monomer containing sulfonic acid or sulfonate group is usually carried out by radical polymerization, preferably emulsion polymerization, especially no-emulsifier emulsion polymerization in which the monomers are self-emulsified. In this case, water is preferably used as solvent, but if necessary, a hydrophilic organic solvent may be additionally used.

Examples of the hydrophilic organic solvent are aliphatic and alicyclic alcohols, glycols, esters, ethers and ketones. Specifically, the alcohols include methanol, ethanol, isopropanol, n-butanol, etc.; the glycols include ethylene glycol, propylene glycol, etc.; the esters include ethyl acetate, amyl acetate, etc.; the ethers include methyl cellosolve, ethyl cellosolve, n-butyl cellosolve, t-butyl cellosolve, etc.; and the ketones include methyl ethyl ketone, etc. These hydrophilic organic solvents may be used either singly or as a mixture of two or more of them.

The laminated polyester film of the present invention has a layer containing an antistatic agent on at least one side of the polyester film. For providing the layer containing the antistatic agent, there can be used extrusion laminating method, melt coating method, etc., but it is preferred to employ a method in which a coating solution containing the high-molecular-weight antistatic agent is applied to a polyester film and then dried.

For preparation of the coating solution, it is preferable to additionally use at least one type of resin selected from polyester resin, acrylic resin, polyurethane resin and their modified resins. As examples of such additive resin and its form of use, there are mentioned an aqueous dispersion of a polyester resin containing sulfonate, an emulsion of an acrylic resin containing hydroxyl group and an emulsion of a polyurethane resin containing carboxylate.

In the coating solution, there may be contained a crosslinking agent such as melamine type, urea type or epoxy type, a heat decomposable peroxide, a light reactive vinyl compound, a photosensitive resin, inorganic particles such as particles of silica, alumina, calcium carbonate, titanium oxide, carbon black and the like, or organic particles such as crosslinked polystyrene particles. Other substances such as a defoaming agent, an applicability improver, a thickening agent, an organic lubricant, an antioxidant, an ultraviolet absorber, a dye, etc., may also be contained, if necessary.

Further, in the coating solution, a hydrophilic organic solvent may be contained for improving coatability or stability of the coating solution. The above-mentioned hydrophilic organic solvents may be used for this purpose.

The laminated polyester film of the present invention can be obtained by applying the coating solution on a surface of a polyester film and removing the solvent by drying. The coating solution containing the high-molecular-weight antistatic agent is capable of forming a uniform coating film on the polyester film. Coating can be carried out by employing a suitable coating method such as reverse-roll coating, gravure coating, rod coating and air doctor coating as described in Y. Harasaki: Coating Systems, Maki Shoten, 1977.

In the present invention, a in-line coating method is advantageously employed. This method comprises applying a coating solution on a non-stretched polyester film and biaxially stretching the coated film successively or simultaneously; or comprises applying a coating solution of a uniaxially stretched polyester film and stretching the coated film in the direction orthogonal to the initial uniaxially stretched direction; or comprises applying a coating solution on a biaxially stretched polyester film and further stretching the coated film in the transverse and/or machine direction. Use of this in-line coating method makes it possible to accomplish drying in the step of stretching and also enables reduction of thickness of the coating layer in correspondence to the stretch ratio, thus allowing relatively low-cost production of a film having excellent adhesiveness to the coating layer and suited for use as a polyester film base.

For example, the in-line coating method may comprise the steps of stretching an non-stretched polyester film monoaxially by 2 to 6 times at a temperature of from 60° to 130° C. for example, by a roll stretching method; applying a coating solution comprising the high-molecular-weight antistatic agent to one or both surface of the monoaxially stretched polyester film; optionally drying the coated polyester film; and stretching the resultant polyester film by 2 to 6 times at a temperature of from 80° to 130° C. in a direction perpendicular to the previous stretching direction.

The coated polyester film may be subjected to heat-treatment, for example, at a temperature of from 150° to 50° C. for 1 to 600 seconds.

The content of the high-molecular-weight antistatic agent in the layer containing the antistatic agent is usually 1 to 100% by weight, preferably 5 to 100% by weight in the dry state. The thickness of the layer containing the antistatic agent is usually 0.005 to 5 μm, preferably 0.01 to 1 μm.

The coating solution may be applied either on one side of the polyester film or on both sides thereof. In case where the coating solution is applied on one side only, a layer other than the layer containing the antistatic agent may be formed on the opposite side to impart other properties to the film. The pre-coating film may be subjected to a chemical or discharge treatment for improving the application properties of the coating solution on the polyester film and adhesiveness of the coating layer to the polyester film. Also, a discharge treatment may be applied on the layer containing the antistatic agent after formation thereof on the polyester film for improving coating properties and adhesiveness of the laminated polyester film of the present invention to the layer containing the antistatic agent.

According to the present invention, as described above, by use of a high-molecular-weight antistatic agent having a group containing nitrogen atom and a sulfonic group or sulfonic base, it is possible to obtain a laminated polyester film having excellent antistatic properties without impairing transparency even when it is produced by the so-called in-line coating method.

EXAMPLES

The present invention is described in more detail with reference to the following Examples. It should be understood, however, that these Examples are merely intended to be illustrative and not to be construed as limiting the scope of the invention.

In the Examples, all "parts" are parts by weight unless otherwise noted.

Also, in the following Examples, the property evaluations of the laminated films were made according to the methods described below.

(1) Surface resistivity

A concentric circular electrode "16008A" (trade name) (inner electrode: 50 mm in diameter; outer electrode: 70 mm in diameter), manufactured by Yokokawa Hewlet Packard, Ltd., was set on a specimen under an atmosphere of 23° C. and 50% RH. A voltage of 100 V was applied thereto and surface resistivity of the specimen was measured by a high resistance meter "4329A" (trade name) manufactured by the above company. Surface resistivity was evaluated according to the following criterion (unit: $10^{11}$ Ω/□).

less than 1: ○ (good)

not less than 1 and less than 100: Δ (fair)

not less than 100: x (bad)

(2) Transparency

Film haze was measured according to JIS-K6714 by using NDH-300A mfd. by Nippon Denshoku Kogyo KK, and transparency was evaluated according to the following criterion.

less than 5%: ○ (good)

not less than 5% and less than 10%: Δ (fair)

not less than 10%: x (bad)

The resins used with high-molecular-weight antistatic agents in the following Examples are as follows:

(1) Polyester resin

A polyester resin composed of 56 mol % of terephthalic acid, 40 mol % of isophthalic acid and 4 mol % of 5-lithiumsulfoisophthalic acid; and 70 mol % of ethylene glycol, 13 mol % of diethylene glycol and 17 mol % of 1,4-butanediol.

(2) Water-soluble polyacrylic resin

A water-soluble acrylic resin mainly composed of methyl acrylate, isobutyl methacrylate, acrylic acid, methacrylic acid and glycidyl methacrylate, in which carboxyl groups are neutralized with ammonia.

(3) Polyurethane resin

A polyester polyurethane resin having carboxylate group, APX-101, produced by Dai-Nippon Ink Chemical Industries Co., Ltd.

The monomer compositions of the high-molecular-weight antistatic agents used in the following Examples are shown in Table 1. The unit of the figures in the table is mol %.

TABLE 1

|   | EA | MA | MMA | DMAEMA | SVS | SAS | SSS | M.W. |
| --- | --- | --- | --- | --- | --- | --- | --- | --- |
| Antistatic agent A | 30 | 30 | — | 10 | 30 | — | — | 50000 |
| Antistatic agent B | 36 | 36 | — | 10 | 18 | — | — | 70000 |
| Antistatic agent C | — | 30 | 30 | 10 | — | 25 | — | 60000 |
| Antistatic agent D | — | — | — | — | — | — | 100 | 35000 |
| Antistatic agent E | 35 | 35 | — | — | 30 | — | — | 50000 |

The symbols used in Table 1 represent the following compounds:
EA: ethyl acrylate
MA: methyl acrylate
MMA: methyl methacrylate
DMAEMA: dimethylaminoethyl methacrylate
SVS: sodium vinylsulfonate
SAS: sodium allylsulfonate
SSS: sodium styrenesulfonate The symbols used in Table 1 represent the following compounds:

EA: ethyl acrylate

MA: methyl acrylate

MMA: methyl methacrylate

DMAEMA: dimethylaminoethyl methacrylate
SVS: sodium vinylsulfonate
SAS: sodium allylsulfonate
SSS: sodium styrenesulfonate

Example 1

Polyethylene terephthalate having an intrinsic viscosity of 0.65 was melt-extruded at 280° to 300° C. and cast onto a cooling drum using a static adhesion method to obtain an amorphous film of 820 μm in thickness. This film was stretched by 3.3 times in the machine direction at 95° C., then further stretched by 3.3 times in the transverse direction at 110° C. and heat-treated at 210° C. to obtain a biaxiallay stretched polyester film of 75 μm in thicknesss.

In the above stretching process, a coating solution composed of an aqueous dispersion containing 70 parts of the polyester resin and 30 parts of the high-molecular-weight antistatic agent A was applied to one side of the film which has been stretched in the machine direction but not yet stretched in the transverse direction, so as to make the thickness of the coating layer 0.1 μm. The total concentration of the polyester resin and the high-molecular-weight antistatic agent in the aqueous dispersion was adjusted to be about 10% by weight. The same adjustment of the component concentration was made in the following Examples.

Example 2

A laminated film was obtained by the same procedure as in Example 1 except that the thickness of the coating layer was made 0.05 μm.

Example 3

A laminated film was obtained by the same procedure as in Example 1 except for use of an aqueous dispersion of 50 parts of the polyester resin and 50 parts of the high-molecular-weight antistatic agent A.

Example 4

A laminated film was obtained by the same procedure as in Example 1 except for use of the water-soluble acrylic resin in place of the polyester resin.

Example 5

A laminated film was obtained by the same procedure as in Example 1 except for use of the polyurethane resin in place of the polyester resin.

Example 6

A laminated film was obtained by the same procedure as in Example 1 except for use of the high-molecular-weight antistatic agent B in place of A.

Example 7

A laminated film was obtained by the same procedure as in Example 1 except for use of the high-molecular-weight antistatic agent C in place of A.

Example 8

A laminated film was obtained by the same procedure as in Example 1 except for use of an aqueous dispersion containing the high-molecular-weight antistatic agent A alone as the coating solution.

Example 9

A laminated film was obtained by the same procedure as in Example 1 except for use of an aqueous dispersion containing the high-molecular-weight antistatic agent B alone as the coating solution.

Comparative Example 1

A film was obtained by the same procedure as in Example 1 except for non-use of the coating solution.

Comparative Example 2

A laminated film was obtained by the same procedure as in Example 1 except that an aqueous dispersion containing the polyester resin alone was used as the coating solution.

Comparative Example 3

A laminated film was obtained by the same procedure as in Example 1 except that an aqueous dispersion containing the water-soluble polyacrylic resin alone was used as the coating solution.

Comparative Example 4

A laminated film was obtained by the same procedure as in Example 1 except that an aqueous dispersion containing the polyurethane resin alone was used as the coating solution.

Comparative Example 5

A laminated film was obtained by the same procedure as in Example 1 except that an aqueous dispersion containing 70 parts of the polyester resin and 30 parts of the high-molecular-weight antistatic agent D was used as the coating solution.

Comparative Example 6

A laminated film was obtained by the same procedure as in Example 1 except that an aqueous dispersion containing 70 parts of the water-soluble polyacrylic resin and 30 parts of the high-molecular-weight antistatic agent D was used as the coating solution.

Comparative Example 7

A laminated film was obtained by the same procedure as in Example 1 except that an aqueous dispersion containing 70 parts of the polyurethane resin and 30 parts of the high-molecular-weight antistatic agent D was used as the coating solution.

Comparative Example 8

A laminated film was obtained by the same procedure as in Example 1 except that an aqueous dispersion containing 70 parts of the polyester resin and 30 parts of the high-molecular-weight antistatic agent E was used as the coating solution.

Comparative Example 9

A laminated film was obtained by the same procedure as in Example 1 except that an aqueous dispersion containing the high-molecular-weight antistatic agent D alone was used as the coating solution.

Comparative Example 10

A laminated film was obtained by the same procedure as in Example 1 except that an aqueous dispersion containing the high-molecular-weight antistatic agent E alone was used as the coating solution.

The compositions of the coating solutions used and the results of property evaluations of the laminated films obtained in the above Examples and Comparative Examples are shown in Tables 2 and 3.

TABLE 3

| | Comparative examples | | | | | | | | | |
|---|---|---|---|---|---|---|---|---|---|---|
| | 1 | 2 | 3 | 4 | 5 | 6 | 7 | 8 | 9 | 10 |
| Coating layer composition | | | | | | | | | | |
| Polyester resin | — | 100 | — | — | 70 | — | — | 70 | — | — |
| Polyacrylic resin | — | — | 100 | — | — | 70 | — | — | — | — |
| Polyurethane resin | — | — | — | 100 | — | — | 70 | — | — | — |
| Antistatic agent A | — | — | — | — | — | — | — | — | — | — |
| Antistatic agent B | — | — | — | — | — | — | — | — | — | — |
| Antistatic agent C | — | — | — | — | — | — | — | — | — | — |
| Antistatic agent D | — | — | — | — | 30 | 30 | 30 | — | 100 | — |
| Antistatic agent E | — | — | — | — | — | — | — | 30 | — | 100 |
| Coating film thickness (μm) | — | 0.1 | 0.1 | 0.1 | 0.1 | 0.1 | 0.1 | 0.1 | 0.1 | 0.1 |
| Transparency | | | | | | | | | | |
| Haze (%) | 4.7 | 4.8 | 4.9 | 4.8 | 70.5 | 52.0 | 53.6 | 50.3 | 12.8 | 25.4 |
| Rating | O | O | O | O | X | X | X | X | X | X |
| Antistatic properties | | | | | | | | | | |
| Resistivity ($\times 10^{11}$) | 1000> | 1000> | 1000> | 1000> | 1000> | 0.1 | 0.4 | 1000> | 1000> | 0.1 |
| Rating | X | X | X | X | X | O | Δ | X | X | O |

TABLE 2

| | Examples | | | | | | | | |
|---|---|---|---|---|---|---|---|---|---|
| | 1 | 2 | 3 | 4 | 5 | 6 | 7 | 8 | 9 |
| Coating layer composition | | | | | | | | | |
| Polyester resin | 70 | 70 | 50 | — | — | 70 | 70 | — | — |
| Polyacrylic resin | — | — | — | 70 | — | — | — | — | — |
| Polyurethane resin | — | — | — | — | 70 | — | — | — | — |
| Antistatic agent A | 30 | 30 | 50 | 30 | 30 | — | — | 100 | — |
| Antistatic agent B | — | — | — | — | — | 30 | — | — | 100 |
| Antistatic agent C | — | — | — | — | — | — | 30 | — | — |
| Antistatic agent D | — | — | — | — | — | — | — | — | — |
| Antistatic agent E | — | — | — | — | — | — | — | — | — |
| Coating film thickness (μm) | 0.1 | 0.05 | 0.1 | 0.1 | 0.1 | 0.1 | 0.1 | 0.1 | 0.1 |
| Transparency | | | | | | | | | |
| Haze (%) | 4.8 | 4.7 | 4.6 | 4.9 | 4.8 | 4.7 | 5.6 | 5.0 | 4.6 |
| Rating | O | O | O | O | O | O | Δ | O | O |
| Antistatic properties | | | | | | | | | |
| Resistivity ($\times 10^{11}$) | 0.1 | 1.2 | 0.02 | 0.1 | 0.1 | 1.3 | 0.6 | 0.01 | 2.1 |
| Rating | O | Δ | O | O | O | Δ | O | O | Δ |

What is claimed is:

1. A laminated polyester film comprising a polyester film and a layer comprising an antistatic agent formed on the polyester film, wherein the antistatic agent has a number average molecular weight of $10^3$ to $10^7$, wherein the antistatic agent contains at least one nitrogen atom-containing group selected from the group consisting of an amino group, an alkylamino group, and a pyridyl group, wherein the antistatic agent contains at least one sulfur atom-containing group selected from a sulfonic acid and a sulfonate group, wherein the content of sulfur atoms in the antistatic agent is from 1 to 20% by weight and the content of nitrogen atoms in the antistatic agent is from 0.03 to 10% by weight, wherein the ratio of the number of said sulfur atom-containing groups to the number of said nitrogen atom-containing groups is from 1.05 to 150, wherein the layer containing the antistatic agent comprises 1 to 100% by weight of the antistatic agent, and wherein the thickness of said layer containing the antistatic agent is 0.005 to 5 μm.

2. A laminated polyester film according to claim 1, wherein said content of sulfur atoms is 3 to 18% by weight.

3. A laminated polyester film according to claim 1, wherein said content of nitrogen atoms is 0.05 to 7% by weight.

4. A laminated polyester film according to claim 1, wherein said ratio is 1.5 to 100.

5. A laminated polyester film according to claim 1, which is obtained by applying the high-molecular-weight antistatic agent on a stretched or non-stretched polyester film and then stretching the coated polyester film.

6. A laminated polyester film according to claim 1, wherein the nitrogen-atom containing group comprises a pyridyl group.

7. A laminated polyester film according to claim 1, wherein the nitrogen-atom containing group comprises an amino group.

8. A laminated polyester film according to claim 1, wherein the nitrogen-atom containing group comprises an alkylamino group.

9. A laminated polyester film according to claim 8, wherein the alkylamino group is a C1–C2 alkyl amino group.

10. A laminated polyester film according to claim 1, wherein the polyester film comprises one or more of polyethylene terephthalate, polyethylene naphthalate, and poly-1,4-cyclohexanedimethylene terephthalate.

11. A laminated polyester film according to claim 1, wherein the antistatic agent is obtained by copolymerizing a monomer containing the nitrogen-atom containing group and a monomer containing the sulfur-atom containing group.

12. A laminated polyester film according to claim 1, wherein the antistatic agent has a number-average molecular weight of 5,000 to 500,000.

13. A laminated polyester film according to claim 1, wherein the layer containing the antistatic layer is a coating layer.

14. A laminated polyester film according to claim 13, wherein the layer comprising the coating layer comprises at least one resin selected from the group consisting of polyesters, acrylics, and polyurethanes.

15. A laminated polyester film as claimed in claim 1, wherein the antistatic agent is not crosslinked.

16. A laminated polyester film according to claim 1, wherein the polyester film is biaxially oriented.

17. A method of making a laminated polyester film according to claim 1, comprising the steps of coating a coating composition comprising the antistatic agent on a stretched or non-stretched polyester film to give a coated polyester film, and then stretching the coated polyester film.

* * * * *